Figure 1:
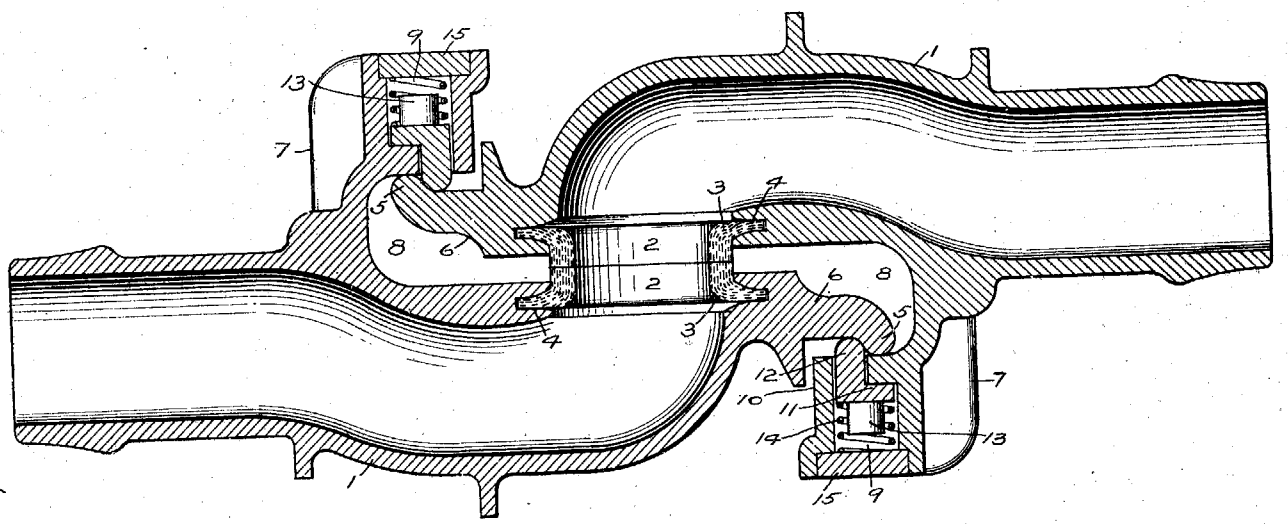

W. W. KILPATRICK.

AIR HOSE COUPLING.

APPLICATION FILED JULY 1, 1908.

12,902.

Reissued Dec. 29, 1908.

2 SHEETS—SHEET 1.

WITNESSES

Wm. M. Cady

J. Custer

INVENTOR

Walter W. Kilpatrick by E. A. Wright

Att'y.

THE NORRIS PETERS CO., WASHINGTON, D. C.

W. W. KILPATRICK.

AIR HOSE COUPLING.

APPLICATION FILED JULY 1, 1908.

12,902. Reissued Dec. 29, 1908.

2 SHEETS—SHEET 2.

WITNESSES

Wm. M. Cady

J. Custer

INVENTOR

Walter W. Kilpatrick by E. A. Wright Att'y.

THE NORRIS PETERS CO., WASHINGTON, D. C.

UNITED STATES PATENT OFFICE.

WALTER W. KILPATRICK, OF ATLANTA, GEORGIA, ASSIGNOR, BY MESNE ASSIGNMENTS, TO WESTINGHOUSE AIR BRAKE COMPANY, A CORPORATION OF PENNSYLVANIA.

AIR-HOSE COUPLING.

No. 12,902. Specification of Reissued Letters Patent. Reissued Dec. 29, 1908.

Original No. 882,503, dated March 17, 1908, Serial No. 399,876. Application for reissue filed July 1, 1908. Serial No. 441,508.

*To all whom it may concern:*

Be it known that I. WALTER W. KILPATRICK, a citizen of the United States, residing at Atlanta, in the county of Fulton, State of Georgia, have invented certain new and useful Improvements in Air-Hose Couplings, of which the following is a specification.

This invention relates to hose couplings and is particularly adapted for use as the means for connecting the ends of the air pipes used in trains.

It relates to that particular class of couplings now in standard use for coupling air pipes between railway cars and which embody two duplicate heads having lateral communicating openings provided with gaskets, and in which each head is provided with semi-circular interlocking ribs formed concentric with the opening, the two heads being coupled by simply placing the lateral openings in alinement and relatively rotating the heads in a vertical plane, whereby the counterpart gaskets of the coupling heads are rigidly clamped together. In this class of couplings used between cars the two heads are elevated, brought together and allowed to descend in contact, thus giving them a relative rotation and interlocking them. To unlock the heads it is simply necessary to elevate them sufficiently, but it has been found in practice that the ordinary brakeman often fails to uncouple the hose connection when the cars are to be uncoupled and the consequence is that the separation of the cars, while the heads are interlocked, sometimes ruptures or injures the hose connection and throws the system out of operative condition.

The object of my invention is to provide a coupling head of the above described standard type with improved means adapted to permit the coupling heads to readily separate without injury to the hose or its connections, when subjected to a longitudinal pull such as that which occurs when the two cars which are connected by the coupling separate.

My improvements may be applied to a standard form of coupling having means for positively locking the heads together against relative longitudinal movement when in the normal position, but it is obvious that the invention is not limited to such construction, since it may be found in certain instances that this positive locking means for the coupling heads is unnecessary. It will be understood that the coupling heads in this class of devices normally hang below the horizontal line of the hose connection, and that when the cars separate the longitudinal pull on the hose connection straightens it and elevates the interlocking heads. This elevation gives the two heads a partial rotation tending to unlock them, and in my improved device the structure is such that when this partial rotation occurs the heads may automatically separate when subjected to undue longitudinal strain without injuring in any way the head or the hose connection.

Figure 2:
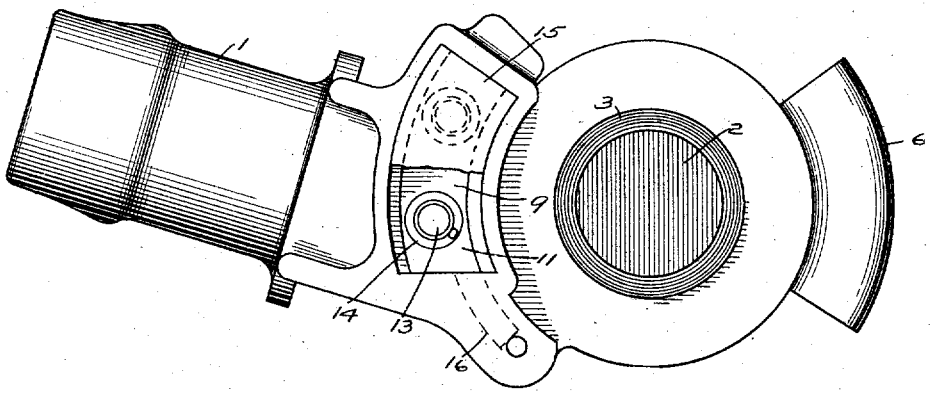
Figure 3:
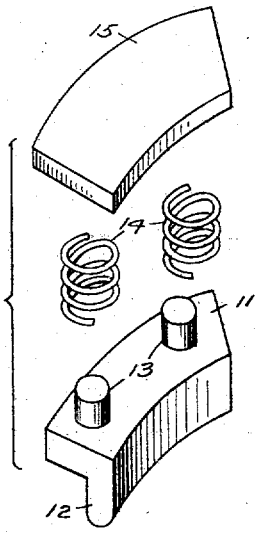

In the accompanying drawings; Figure 1 is a horizontal section through two interlocked coupling heads embodying my invention; Fig. 2 is a side view of one of the heads partly broken away; and Fig. 3 is a detailed perspective view of parts of the automatic interlocking mechanism.

As shown in the drawings, the duplicate heads 1 are provided with lateral communicating openings 2 having the packing rings or gaskets 3 mounted in the circumferential grooves 4. Each head is provided with the semi-circular rib 5 which is formed on a projecting flange 6 on one side of the opening 2 and concentric therewith. On the other side of the opening there is an angular arm 7 which leaves a socket 8 between its outer end and the main wall of the head, the flange 6 of the opposite head being adapted to extend into said socket and bear against the inner face of said arm to rigidly clamp the counterpart gaskets together as in the well known standard coupling. According to the preferred construction of my improvements this arm 7 at its outer end is made hollow, leaving a chamber 9 having a slot 10 in its inner wall facing the main portion of the head, and this slot is made semi-circular and concentric with the openings 2. Within the chamber 9 is an angular piece 11 which is slidably mounted and which has a flange 12 with a rounded outer margin projecting through the slot 10 and forming a rib adapted to coöperate with the rib 5 of the opposite head. Near the ends of the piece 11 are placed pins 13 surrounded by coil springs 14 which bear against the plate 15 which serves as a closure for the chamber 9. It will be noted that the rib formed by the projecting piece 12 may be depressed by pressure thereon and that by reason of its rounded shape and the rounded shape of the rib 5 a longitudinal pull of the rib 5 across this adjustable rib will depress it and allow the parts to separate. On the arms 7 and as a continuation of the adjustable rib there is shown a rib 16 made integral with the arm 7 and serving as a positive interlocking means between the rib 5 and the arm 7. The length of the rigid rib 16 and the relative length of the adjustable spring pressed rib are to be determined from the particular conditions under which the device is used, and in some instances the rigid rib may be entirely dispensed with where its use is found to be unnecessary.

It will be noted that in operation the two coupling heads above described are united in the usual way by bringing the lateral openings into alinement and relatively rotating the heads, and the ribs interlock in the usual way. Since, however, the upper part of one rib of each interlocking pair is held in place simply by spring pressure, the two heads may be made to separate by longitudinal pull at any point in the rotation above that at which the rib 5 reaches and engages the rigid rib 16. This rigid rib 16 will be engaged when the heads are in normal position hanging down by their own weight, thus securely holding the parts together without any possibility of accidental disengagement. If, however, the cars are uncoupled and by their separation a strain is put upon the connecting hose pipe the two heads are elevated thus rotating them sufficiently to disengage the rigid rib 16 from the rib 5 and leaving only the engagement between the rib 5 and the yielding rib 12. At this time the yielding rib 12 bearing against the rib 5 exerts a yielding resistance to relative longitudinal movement of the coupling heads upon each other, but the longitudinal pull applied to the connecting hose pipes by the separation of the cars is sufficient to depress the yielding rib 12 and permit the coupling heads to readily separate without injury to the hose or its connections.

Having thus described my invention, what I claim and desire to secure by Letters Patent, is:—

1. The combination in a pipe coupling of two coupling heads, means for interlocking said heads by rotating them in contact in opposite directions, means for retaining them yieldingly locked after a partial rotation, and means for retaining them rigidly locked after a further rotation.

2. The combination in a pipe coupling of two duplicate heads having lateral communicating openings, means for interlocking said heads against endwise separation by rotating them in opposite directions, means for retaining them rigidly locked when they have been rotated a certain distance, and means for retaining them yieldingly locked when they have been rotated a less distance.

3. The combination in a pipe coupling of two duplicate heads having lateral communicating openings, curved interlocking ribs carried by said heads, the said ribs being upon opposite sides of the openings, and one rib of each interlocking pair being formed in two parts, one part being rigid and the other being yieldingly supported.

4. The combination in a pipe coupling of two duplicate heads having lateral communicating openings, curved interlocking ribs carried by said heads, the said ribs being upon opposite sides of the opening and one rib of each interlocking pair being formed with its lower part rigid with the head and its upper part separate and spring supported.

5. The combination in a pipe coupling, of two duplicate heads having lateral communicating openings, two lateral semi-circular ribs upon each head arranged concentric with the openings, one rib upon each head being rigid and the other being rigid throughout part of its length, and being spring pressed laterally throughout the balance of its length.

6. The combination in a pipe coupling, of two coupling heads, interlocking ribs carried by said heads, one of said ribs formed rigid with the head for a short distance, the head being formed with a slot in line with the short rib and being provided with a chamber back of the slot, a metal piece mounted in said chamber having a portion projecting through said slot, and forming a continuation of said short rigid rib, and a spring bearing upon said piece.

7. The combination in a pipe coupling, of two coupling heads, interlocking ribs carried by said heads, one of said ribs formed rigid with the head for a short distance, the head being formed with a slot in line with the short rib and being provided with a chamber back of the slot, an angular metal piece slidably mounted in said chamber, a flange on said piece projecting through the slot and forming a continuation of said short rigid rib, a cover plate for said chamber, and springs between said plate and slidable metal piece.

8. A coupling head having a lateral opening, a short lateral semi-circular locking rib on said head arranged concentric with said opening, and a depressible spring-supported continuation of said rib.

9. In a pipe coupling, a coupling head having a lateral opening provided with a gasket, means for rigidly pressing the counterpart gaskets into engagement with each other upon a relative rotary movement of the head upon a companion head, and means carried by said head adapted to yieldingly interlock with a companion head and thereby permit the heads to separate upon being subjected to a longitudinal pull.

10. In a pipe coupling, a coupling head having a lateral opening provided with a gasket, means for rigidly pressing the counterpart gaskets into engagement with each other upon a relative rotary movement of the head upon a companion head, and a yielding rib adapted to interlock with a companion head to yieldingly resist relative longitudinal movement of the heads but to permit the heads to separate when subjected to a longitudinal pull.

11. A pipe coupling comprising two coupling heads, each having a lateral port opening provided with a gasket and adapted to rigidly clamp the counterpart gaskets together upon a relative rotative movement of the heads in the act of coupling, and a yielding rib carried by the coupling head for engaging a rib on the companion head to yieldingly resist relative longitudinal movement, whereby the heads are permitted to separate upon subjection to a longitudinal pull.

12. A pipe coupling comprising two counterpart coupling heads, each having a lateral opening provided with a gasket, a rigid angular arm upon one side of the opening and a flange projecting on the other side, and adapted to be coupled with a counterpart head by a relative rotary movement of the flange of one head within the angular arm of the other, said flange bearing against the inner face of said angular arm and holding the gaskets rigidly clamped together, and yielding interlocking means adapted to allow the coupling heads to separate when subjected to a longitudinal pull.

13. A pipe coupling comprising two counterpart coupling heads, each having a lateral opening provided with a gasket, a rigid angular arm upon one side of the opening and a flange projecting on the other side, and adapted to be coupled with a counterpart head by a relative rotary movement of the flange of one head within the angular arm of the other, said flange bearing against the inner face of said angular arm and holding the gasket rigidly clamped together, and a yielding interlocking rib on one of the coupling heads for engaging the other.

14. In a pipe coupling, a coupling head having a lateral opening and adapted to be coupled with a counterpart head by a relative rotary movement of said heads, means for retaining the heads positively locked together after rotation to normal position, and means for permitting said heads to separate when rotated to an intermediate position.

15. In a pipe coupling, a coupling head having a lateral opening and adapted to be coupled with a counterpart head by a relative rotary movement of said heads, means for retaining the heads positively locked together when they have been rotated the full distance to normal position, and means for permitting said heads to separate when rotated a less distance to an intermediate position.

In testimony whereof I have hereunto set my hand.

WALTER W. KILPATRICK.

Witnesses:
A. D. SMITH,
GEO. A. K. STEVENS.